US010024659B2

(12) United States Patent
Riek

(10) Patent No.: US 10,024,659 B2
(45) Date of Patent: Jul. 17, 2018

(54) SYSTEM AND METHOD FOR INTELLIGENTLY COUPLING AND CONNECTING MOBILE TERMINALS TO A COORDINATE-MEASURING DEVICE

(71) Applicant: CARL ZEISS INDUSTRIELLE MESSTECHNIK GMBH, Oberkochen (DE)

(72) Inventor: Matthias Riek, Aalen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 0 days.

(21) Appl. No.: 15/575,094

(22) PCT Filed: May 3, 2016

(86) PCT No.: PCT/EP2016/059878
§ 371 (c)(1),
(2) Date: Nov. 17, 2017

(87) PCT Pub. No.: WO2016/188713
PCT Pub. Date: Dec. 1, 2016

(65) Prior Publication Data
US 2018/0143016 A1   May 24, 2018

(30) Foreign Application Priority Data

May 22, 2015   (DE) .................. 10 2015 108 180

(51) Int. Cl.
*G01B 21/04*        (2006.01)
*H04W 4/80*         (2018.01)
(Continued)

(52) U.S. Cl.
CPC .......... *G01B 21/047* (2013.01); *H04L 63/083* (2013.01); *H04W 4/80* (2018.02);
(Continued)

(58) Field of Classification Search
CPC ..................................................... H04W 12/06
See application file for complete search history.

(56) References Cited

U.S. PATENT DOCUMENTS 6,023,507 A * 2/2000 Wookey .............. G06F 11/2294
380/285
8,281,129 B1 * 10/2012 Asghari-Kamrani ... G06F 21/31
705/74
(Continued)

FOREIGN PATENT DOCUMENTS

DE   102010045071 A1   3/2012
DE   102013105226 A1   11/2014
(Continued)

OTHER PUBLICATIONS

Lineberger, Lewis: "Encryption for Remote Control via Internet or Intranet"; NASA Tech Briefs, Mar. 1, 2005 (Mar. 1, 2005), URL: http://ntrs.nasa.gov/archive/nasa/casi.ntrs.nasa.gov/20110014772 (in English).
(Continued)

*Primary Examiner* — Hsin-Chun Liao
(74) *Attorney, Agent, or Firm* — Harness, Dickey & Pierce, P.L.C.

(57) ABSTRACT

A coordinate-measuring system and related method for securely and intelligently coupling and connecting a mobile terminal device to a stationary coordinate-measuring device. A mobile terminal is arranged to be physically separate from and movable in relation to the coordinate-measuring device and is designed for the operation of the coordinate-measuring device. The coordinate-measuring device and the mobile terminal are designed to establish an authenticated wireless connection for exchanging data between the coordinate-measuring device and the mobile terminal. An identifier, which uniquely identifies the coordinate-measuring device, and a dynamic first key are associated with the coordinate-
(Continued)

measuring device. The dynamic first key represents an access authorization and preferably also a degree of access authorization of the user. The mobile terminal device is also designed to request the first key from the user. The first key is used for authentication in the establishment of the wireless connection.

13 Claims, 4 Drawing Sheets

(51) Int. Cl.
  *H04W 12/08* (2009.01)
  *H04W 12/06* (2009.01)
  *H04L 29/06* (2006.01)
  *H04W 12/04* (2009.01)

(52) U.S. Cl.
  CPC ........... *H04W 12/04* (2013.01); *H04W 12/06* (2013.01); *H04W 12/08* (2013.01); *G01B 2210/58* (2013.01); *G01B 2210/60* (2013.01)

(56) References Cited

U.S. PATENT DOCUMENTS

| | | |
|---|---|---|
| 2002/0032541 A1* | 3/2002 | Raab .................... G01B 21/047 702/152 |
| 2006/0026672 A1 | 2/2006 | Braun |
| 2006/0135065 A1 | 6/2006 | Lee et al. |
| 2010/0039391 A1 | 2/2010 | Spink et al. |
| 2012/0054493 A1 | 3/2012 | Bradley |

FOREIGN PATENT DOCUMENTS

| | | |
|---|---|---|
| DE | 102013106059 A1 | 12/2014 |
| EP | 2505959 A1 | 10/2012 |

OTHER PUBLICATIONS

International Search Report (in English and German) issued in PCT/EP2016/059878, dated Jul. 13, 2016; ISA/EP.

* cited by examiner

SYSTEM AND METHOD FOR INTELLIGENTLY COUPLING AND CONNECTING MOBILE TERMINALS TO A COORDINATE-MEASURING DEVICE

CROSS-REFERENCE TO RELATED APPLICATIONS

This application is a national phase of international patent application PCT/EP2016/059878, filed on May 3, 2016 designating the U.S., which international patent application has been published in German and claims priority from German patent application DE 10 2015 108 180.6, filed on May 22, 2015. The entire contents of these prior applications are incorporated herein by reference.

BACKGROUND OF THE INVENTION

The present invention relates to a coordinate-measuring system for securely and intelligently coupling and connecting a mobile terminal device to a stationary arranged coordinate-measuring device. The invention further relates to a method for securely and intelligently coupling as well as connecting the mobile terminal device to the stationary arranged coordinate-measuring device. In addition, the invention relates to a coordinate-measuring device as well as a mobile terminal device being configured for the utilization in such a coordinate-measuring system. Finally, the invention relates to a computer program being configured for executing the method of the invention on a data-processing system.

The document DE 10 2010 045 071 A1 discloses a portable height-measuring and laying-out device for three-dimensional measuring a position of an object within a selected volume and/or laying out workpieces consisting of at least one moveable arm carrying a measuring, or laying-out, tool. The position the measuring and/or laying-out tool is forwarded via measuring means directly or indirectly to a computer for determining and detecting measuring values. The measuring tool comprises a hand piece which can be combined with a PDA (personal digital assistant), a smartphone, or a suitable mobile phone. These mobile (terminal) devices are coupled directly (wired) or indirectly (wireless) to the measuring device. By means of suitable software the substantial functions, the current coordinates, deviations, and the like can be illustrated on the respective display. By means of integrated control and input elements of the respective device such as a touchscreen, a keyboard, a joystick, or the like the substantial functions of the measuring software can be controlled by the respective device.

The document DE 10 2010 045 071 A1 discloses a coordinate system for securely and intelligently coupling and connecting a mobile terminal device to a stationary arranged coordinate-measuring device.

The document EP 2 505 959 A1 discloses a stationary arranged coordinate-measuring device comprising a measuring system, a control unit for the measuring system, as well as a remotely arranged evaluation unit. A mobile hand-held device (hand-held device) is additionally provided which communicates wirelessly, such as over WLAN or IR, with the control unit and/or the evaluation unit in order to move, for example, a probe of the measuring system within space by moving the hand device correspondingly within the space, wherein the movements of the hand devices are detected, for example, by inertial sensors. The hand device can be implemented, in particular, by a tablet computer on which the measured positions can also be illustrated.

The document US 2006/0135065 A1 discloses a Bluetooth device and a method for providing a service being determined by a Bluetooth PIN.

In the following coordinate-measuring devices will be described generally, i.e. devices having a measuring system or measuring head being moveable within a defined measuring volume relative to a workpiece. Defined measuring points on the workpiece are travelled to and measured by means of the measuring head. For this purpose the measuring head is often provided with touching elements, in particular in terms of a contact feeler having a spherical free end by which the desired measuring points on the workpiece are touched physically. Hence, a corresponding measuring head is frequently called a touching head. Alternatively, there are measuring heads by which defined measuring points on the workpiece are measured in a contactless manner, in particular by optical sensors. A control and evaluation unit determines from the position of the measuring head within measuring volume and, if desired, from the position of the scanning element relative to the measuring head during touching of the workpiece spatial coordinates representing the touched measuring point or the to-be-measured object. If the spatial coordinates are determined at a plurality of measuring points the geometrical properties of the workpiece can be measured such as the diameter of a drilling or the spatial distance of two geometry elements on the workpiece. Beyond that a plurality of spatial coordinates allow determination of measuring curves representing the spatial shape of individual geometry elements or even the spatial shape of the entire workpiece. Geometrical dimensions such as the diameter of a drilling or the distance between two geometry elements are frequently determined only by means of the measuring curves.

Since the coordinate-measuring devices typically are very expensive and have a complex structure, it is desirable in case that mobile terminal devices are used for operating the coordinate-measuring device to control the establishment of wireless connection between the coordinate-measuring device and the mobile terminal device, i.e. to verify the connection establishment and the data exchange with regard to an authorization and authenticity of the user of the mobile terminal device.

Further, it happens frequently that several coordinate-measuring systems are operated simultaneously within immediate vicinity to each other, for example in one single room. Therefore, it is desirable to ensure that a wireless connection is established and occurs only between the selected coordinate-measuring device and the mobile terminal device. Further, the connection is to be secure and the authorized user shall be allowed to establish the same.

Further, it is desirable to control the possibilities of using the mobile terminal device dependent on a degree of an access authorization. Thus, for example, an end user shall be displayed substantially only data and simple non-dangerous control options shall be provided. A service technician in turn shall have greater options of manipulation. For example, the service technician shall be allowed to change basic parameters of the coordinate-measuring device directly on site, which basic parameters could lead to the damage, if set improperly, or even to the destruction of the coordinate-measuring device. Often it is the case that the control unit and/or the evaluation unit are arranged remotely to the measuring system which makes it impossible to set these parameters on the site of the measuring system.

SUMMARY OF THE INVENTION

Therefore, it is an object of the present invention to provide a secure and intelligent system and method for coupling and connecting a coordinate-measuring device to a mobile terminal device.

The object is solved by a coordinate-measuring system for securely and intelligently coupling and connecting a mobile terminal device to a stationary arranged coordinate-measuring device comprising: a stationary arranged coordinate-measuring device which comprises: a measuring system; an evaluating and control unit having a first data-processing unit; a first memory unit for storing data, parameters, and programs; and a first transmitter/receiver unit for wireless communication; and a mobile terminal device which is arranged physically separate from, as well as movable relative to, the coordinate-measuring device and which is configured for operating the coordinate-measuring device and/or for displaying data of the coordinate-measuring device by a user, wherein the mobile terminal device comprises: a second data-processing unit; a second memory unit for storing data and programs; and a second transmitter/receiver unit for the wireless communication; wherein the coordinate-measuring device and the mobile terminal device are configured for establishing an authenticated wireless connection for exchanging data between the coordinate-measuring device and the mobile terminal device; wherein the coordinate-measuring device has assigned an identifier, which uniquely identifies the coordinate-measuring device, as well as a dynamic first key, wherein the dynamic first key represents an access authorization and preferably also a degree of access authorization of the user, wherein different degrees of access authorization result in different first keys; and wherein the mobile terminal device is further configured for requesting the first key from the user, wherein the first key is used for authentication during the establishment of the wireless connection.

Each specific wireless connection between the mobile terminal device and a coordinate-measuring device is characterized by and can be identified by the identifier and the static key, respectively. The connection establishment is secure since it can be performed only with knowledge of the dynamic key which is determined by the respective coordinate-measuring device and an evaluating and control unit thereof, respectively. Thus, it is excluded that a non-authorized user can establish a wireless connection from his/her (non-authorized) mobile terminal device to one of the coordinate-measuring devices.

Further, it is ensured that a wireless connection is always established only for the desired coordinate-measuring device.

Preferably, the dynamic first key is specific for the coordinate-measuring device, and the identifier static second key is specific for the coordinate-measuring device, particularly stored in the first memory unit.

Each of the coordinate-measuring devices obtains a dedicated, i.e. its own, dynamic first key by which the authentication is performed in a machine-specific manner. The first key is dynamic because it can be changed. The second key is static because typically it is not changed any more after an initial setting thereof.

With one embodiment the evaluating and control unit is configured to generate, in accordance with a generation rule being stored in the first memory unit, based on the dynamic first key and the static second key a coordinate-measuring device specific authorization key, and to store the generated authorization key in the first memory unit, wherein the wireless connection is authenticated by means of the so-generated authorization key; and wherein the mobile terminal device is configured to request the static second key and to generate then, with knowledge of the dynamic first key and the static second key in accordance with the generation rule which is also stored in the second memory unit, the identical authorization key and to store the same in the second memory unit for the authenticated establishment of the wireless connection.

Due to the calculation of the authorization key, by utilization in particular of the first key and/or the second key, the connection establishment is secure. The authorization key is secure against attacks from the outside, even if an attacker is successful in getting knowledge of the dynamic key. As a rule, getting knowledge of the static key is not that simple. Getting knowledge of the dynamic key is more difficult because access to the coordinate-measuring device is required for this purpose. However, the generation of the authorization key without the correct generation rule is impossible.

With another embodiment the static second key represents a device type of the coordinate-measuring device, a serial number of the coordinate-measuring device, a manufacturing date of the coordinate-measuring device, a manufacturing location of the coordinate-measuring device, and/or an SAP number of the coordinate-measuring device.

The above-mentioned implementations represent identifiers with which each of the coordinate-measuring devices is provided from the beginning and which identify the respective coordinate-measuring device uniquely.

With another embodiment the static second key uniquely identifies the wireless connection.

With another embodiment the dynamic first key is an alpha-numeric password and/or a signature file.

With another embodiment the static second key is embedded into an optically readable QR code and/or electronically readable NFC chip, or in an RFID chip, wherein the QR code and/or the NFC chip, or the RFID chip, is/are attached to the coordinate-measuring device, and wherein the mobile terminal device comprises a reading unit being configured for reading the QR code and/or the NFC chip, or the RFID chip.

In particular, the mobile terminal device comprises a key port via which the user can import the dynamic first key output by the coordinate-measuring device, wherein the coordinate-measuring device comprises a further key port via which the dynamic first key can be exported.

The key ports allow the physical transport of the dynamic key from the respective coordinate-measuring device to the mobile terminal device. As transport medium, for example, a USB stick can be used which the user physically reads from the evaluating and control device and physically reads into the mobile terminal device.

Preferably, the evaluating and control unit comprises an evaluation device and a control device, wherein the evaluation device is preferably arranged remotely to the measuring system and the control device.

The object is further solved by a method for securely and intelligently coupling as well as connecting the mobile terminal device to a stationary arranged coordinate-measuring device comprising the steps of: defining a dynamic first key, wherein the dynamic first key represents an access authorization and preferably also a degree of access authorization of a user, wherein different degrees of access authorization result in different first keys, and storing the dynamic first key in a first memory unit of the coordinate-measuring device; exporting the dynamic first key from the coordinate-measuring device to the user; importing the dynamic first key into the mobile terminal device by the user; establishing a wireless connection between the coordinate-measuring device and the mobile terminal device, wherein the establishment of the wireless connection is conducted in an authenticated manner by utilization of an identifier, which uniquely identifies the coordinate-measuring device, as well as the dynamic first key by the coordinate-measuring device as well as by the mobile terminal device.

In particular, the identifier is a static second key, wherein the dynamic first key is specific for a coordinate-measuring device, wherein the method further comprises: importing the static second key into the mobile terminal device by the user; generating a coordinate-measuring device specific authorization key based on the dynamic first key and the static second key in accordance with a generation rule by the coordinate-measuring device and the mobile terminal device, wherein the generation rule is stored in the coordinate-measuring device and in the mobile terminal device; and storing the connection key in the coordinate-measuring device and in the mobile terminal device; authenticating the establishment of the wireless connection by utilization of the authorization key.

Preferably, the step of importing the key comprises: reading the dynamic first key from the coordinate-measuring device onto a data-storage medium by the user; reading the read dynamic first keys from the data-storage medium into the mobile terminal device by the user; and reading the static second key by scanning the second static key, which is attached freely accessible to the coordinate-measuring device, by the user by means of the mobile terminal device.

It is clear that the above-mentioned and hereinafter still to be explained features cannot only be used in the respectively given combination but also in other combinations or alone without departing from the scope of the present invention.

BRIEF DESCRIPTION OF THE DRAWINGS

Embodiments of the invention are illustrated in the drawings and will be explained in more detail in the following description, wherein.

DETAILED DESCRIPTION OF THE PREFERRED EMBODIMENTS

Figure 1:
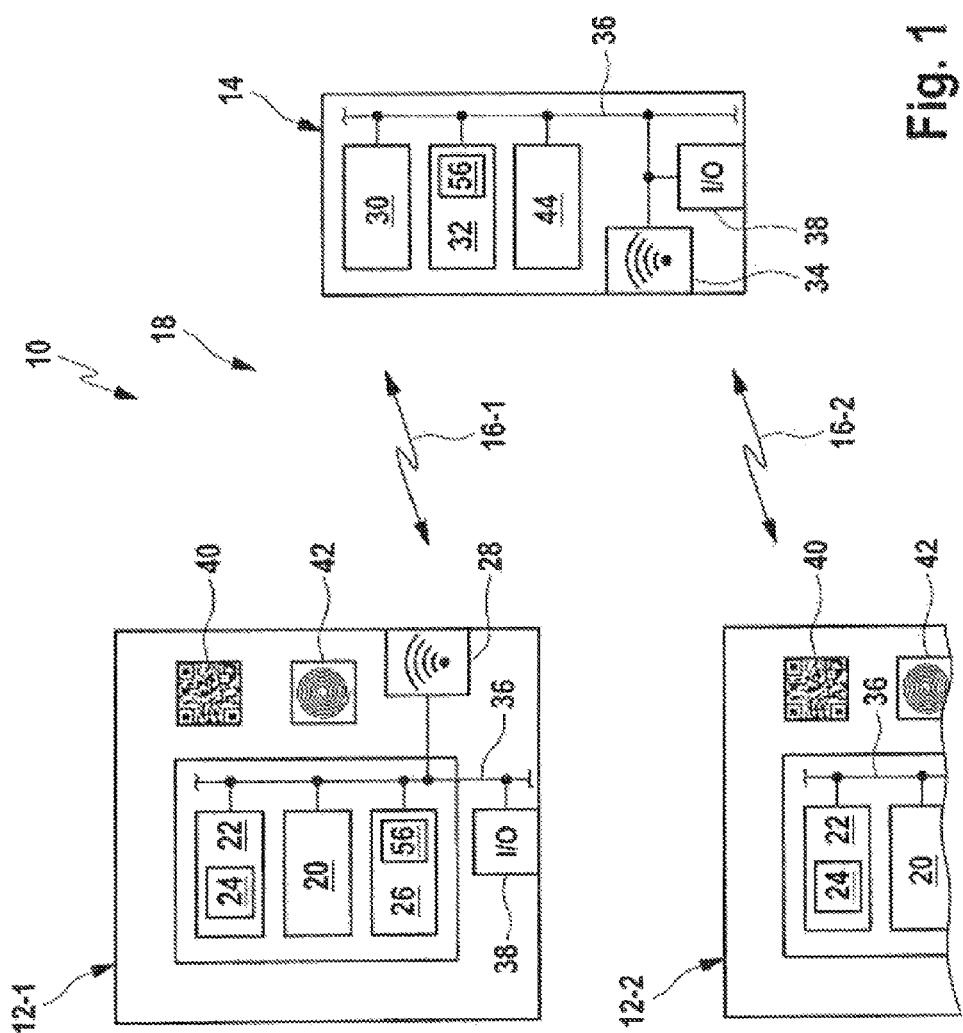
FIG. 1 shows a block diagram of a coordinate-measuring system in accordance with the invention.

FIG. 1 shows a block diagram of a coordinate-measuring system 10 of the invention, which will be designated hereinafter also as the system 10 only. The system 10 comprises at least one coordinate-measuring device 12 as well as a mobile terminal device 14. In FIG. 1 exemplarily two coordinate-measuring devices 12-1 and 12-2 are shown. The coordinate-measuring devices 12 and the mobile terminal device 14 communicate with each other via coordinate-measuring device specific wireless connections 16. The coordinate-measuring devices 12 and the mobile terminal device 14 exchange data with each other via the wireless connections 16. This data can be used, for example, for visualizing workpieces, which are to-be-measured, on the mobile terminal device 14. This data can also be used for controlling the coordinate-measuring device 16 by a user (not shown) who operates the mobile terminal device 14. The mobile terminal device 14 can be used as a "remote control" for the device 12.

Each of the coordinate-measuring devices 12 comprises an evaluating and control unit 22 having at least one data-processing unit 24 (e.g., a microprocessor, CPU, or the like), a measuring system 20 having a measuring head, which is not shown and designated here in more detail, a first memory unit 26 for storing data, parameters, and programs, as well as a transmitter/receiver unit 28 for wireless communication with the mobile terminal device 14. One possible implementation of the coordinate-measuring device 12 is exemplarily described, in particular in the context of FIG. 1, in the document DE 10 2013 106 059 A1.

The mobile terminal device 14 is separated physically from the coordinate-measuring device(s) 12. The mobile terminal device 14 can be moved freely by the end user within space and in particular within the immediate vicinity of the measuring system 20 of the coordinate-measuring devices 12. The mobile terminal device 14 is configured for operating each of the coordinate-measuring devices 12, which in turn can be different with regard to the type thereof. The mobile terminal device 14 is further configured for displaying data of each of the coordinate-measuring devices 12. The mobile terminal device 14 comprises at least one dedicated, i.e. its own, data-processing unit 30 (e.g., a microprocessor, CPU, or the like), a dedicated memory unit 32 for storing data and programs, as well as a dedicated transmitter/receiver unit 34 for the wireless communication with each of the coordinate-measuring devices 12.

The mobile terminal device 14 can be implemented as a mobile data terminal (MDT). A MDT is a device for detecting and storing data without being (physically) coupled to a computer-work station. The data, which are typically captured in real time, are forwarded and transmitted via the wireless connection 16 (e.g., radio or infrared) to the evaluating and control unit 22 of the corresponding coordinate-measuring device 12. The mobile terminal device 14 can be a tablet computer (e.g., an iPad), a PDA, a smartphone, or any similar mobile data-processing and data-displaying device being provided with corresponding display devices, data-input devices, data-exchange interfaces, and the like.

As shown in FIG. 1 the above-described components of the mobile terminal device 14 are connected to each other for exchanging with each other data, which is not shown and described here in more detail. Apart from the above-described components 30 to 34 the mobile terminal device 14 can further comprise an input/output interface 38 for importing data into the mobile terminal device 14 or for exporting data from the mobile terminal device 14, as will be explained in more detail below. The interface 18 can be realized, for example, by a USB port.

The mobile terminal device 14 is configured to be operated by proprietary software (e.g., an app) which is provided by the manufacturer of the coordinate-measuring systems 10 or by the manufacturer of the coordinate-measuring device 12. This software, which is not shown and is designated in more detail in the present case and which will be described in more detail below, is configured for operating the coordinate-measuring device 12 and/or for displaying data of the coordinate-measuring device 12. The software can be downloaded, for example, via an online platform and can be installed on the mobile terminal device 14. This software includes one or more algorithms, which are required for securely and intelligently establishing an authenticated connection and for coupling the mobile terminal device 14 to the coordinate-measuring device 12, as will also be explained in more detail below. This software is also configured for authentication. In the following authentication is to be understood as proof (verification) of an asserted characteristic of an entity such as the authorization of the user in order to use and/or change certain functionalities of the coordinate-measuring device 12. In the present case access to a secured area of the system 10 is granted. The user is authenticated by providing a key. The software subsequently conducts the authentication, in particular also the verification of the authenticity, i.e. the check of the genuineness. Only if this verification is successful the user of the mobile terminal device 14 gets allocated access authorizations, which have been defined in advance, within the framework of his/her authorization for the duration of a session. Thus, the program determines the authorization of the communication partner (i.e. of the mobile terminal device 14, or the user). The authentication happens, in the present case by the knowledge of an information (e.g., password) or by the utilization of a possession (e.g., signature file), as will be explained in more detail below.

The authentication during the establishment of the connection is preferably based on a key, as will be explained in more detail below. Parts of the key can be embedded into a QR code 40 and/or an NFC chip 42.

A QR code (English: quick response code) is a two dimensional pattern which is optically detectable. The pattern typically consists of a square matrix of black and white dots representing the coded data in a binary manner.

The NFC chip 42 is used for the near-field communication (near field communication, abbreviation: NFC) and represents an international transmission standard for contactless exchanging data by radio technology across short distances, particularly across some few centimeters, and having a data-transmission rate of 424 kBit/s. The data transmission either happens wirelessly (e.g., by means of passive RFID tags in accordance with ISO 1443 or ISO 15693) or in a connected manner (e.g., between equivalent active transmitters). The near-field communication is substantially based on RFID technology (radio frequency identification). RFID allows a reading device, on the basis of radio waves, to read a passive electronic transponder (transmitter/receiver) for the identification, authentication, and/or tracking. The near-field communication can be used by active devices as an access key at terminals to content and for services, as for access control in the present case.

The QR code 40 and the NFC chip, or RFID chip 42, preferably represent the identical data. The machine-specific QR code 40 and the machine-specific NFC chip 42 are attached to each of the coordinate-measuring devices 12 in a manner accessible from the outside and visible so that they can be read by the mobile terminal device 14, in particular optically and/or scanned electronically. For this purpose the mobile terminal device 14 is equipped with a corresponding reading unit 44 (e.g., an optical scanner or an electronic active transponder). The data embedded in the QR code 40 or the NFC chip 42 is coordinate-measuring device specific data, which will be designated in the following as an identifier and which uniquely identifies each of the coordinate-measuring devices.

An identifier (also briefly designated as recognition or ID) is a feature being associated with each of the coordinate-measuring devices 12 for uniquely identifying the respective coordinate-measuring device 12. Examples for identifiers are a coordinate-measuring device type, a serial number of the coordinate-measuring device 12, an SAP number of the coordinate-measuring device 12, a manufacturing date of the coordinate-measuring device 12, a manufacturing location of the coordinate-measuring device 12, an overview of the used sensors, and the like. It is clear that the identifier can also be established from a combination of the above-mentioned features. It is important that the identifier uniquely marks the respective coordinate-measuring device 12.

It is clear that the QR code 40 and the NFC chip 42 merely represent exemplary implementations of the identifier. The identifier can also be embedded into a different medium.

The physical attachment of the identifiers on the respective coordinate-measuring devices 12 has the advantage that a user specifically selects (e.g., by scanning the mobile terminal device 14) the respective coordinate-measuring device 12 which he/she wants to address. This is a particular advantage if several coordinate-measuring devices 12 are arranged close to each other, for example, within one single room. In this manner it is ensured that the user selects the correct coordinate-measuring device 12.

Of course, it is also possible that the identifier is transmitted to the mobile terminal device 14, for example, in terms of recognition without active reading by operating both the coordinate-measuring device 12 and the mobile terminal device 14 in a broadcast mode at the beginning of the establishment of the connection.

In a broadcast mode in a network which is formed by the coordinate-measuring devices 12 and the mobile terminal device(s) 14, a message (such as a data packet including the identifier) is transmitted by one participant (e.g., from the mobile terminal device 14) to each of the remaining participants (coordinate-measuring devices 12) of the network. Such a broadcast data packet reaches each of the participants of the network without explicitly indicating them as recipients. Each of the recipients of a broadcast-data packet decides on its own whether the obtained message is processed in case of its responsibility, or otherwise rejects the same tacitly. Also, the broadcast mode is used if, for example, an IP address of a recipient (coordinate-measuring device 12) is still unknown.

Typically, however, the mobile terminal device 14 is held to the NFC chip 42 of the selected coordinate-measuring device 12 and/or the QR code 40 is read by the reading unit 44 (e.g., an integrated camera). By means of the identifier read the mobile terminal device 14 searches, preferably in the broadcast method, the selected coordinate-measuring device 12 for initializing then, as soon as the selected coordinate-measuring device 12 has been found, an establishment of the wireless connection 16.

For the authentication of the establishment of the connection at least one key is used, as mentioned above. A corresponding key concept will be explained below with reference to FIG. 2.

Figure 2A:
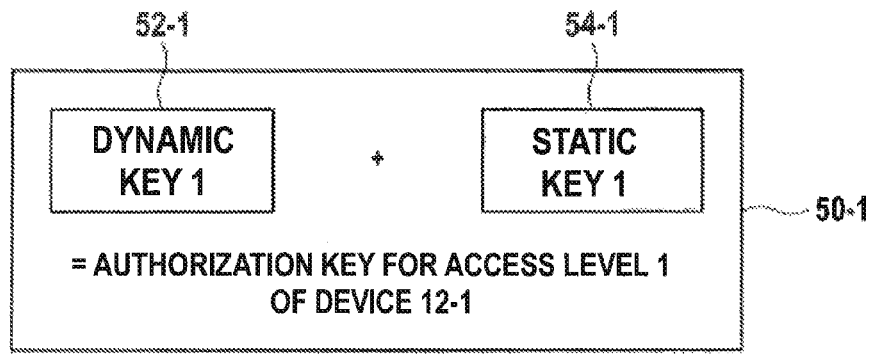
FIGS. 2a-c show block diagrams of different authorization keys.
Figure 2B:
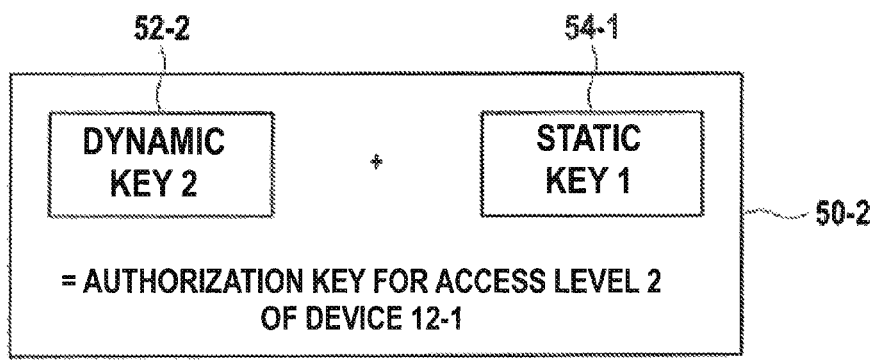
Figure 2C:
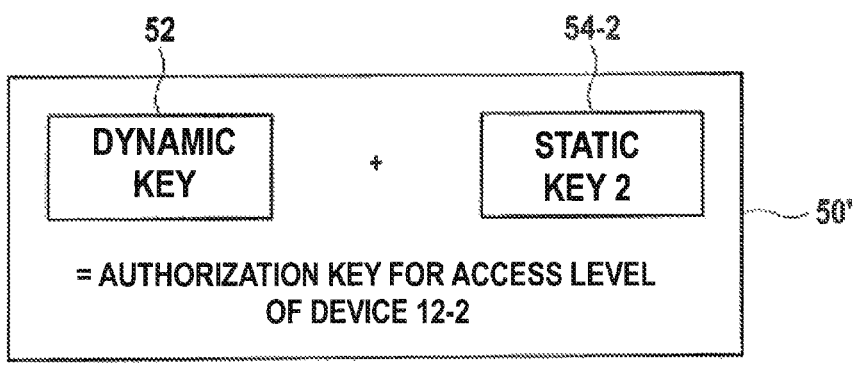

The FIGS. 2a to 2c show different authorization keys 50 which can be used for the authentication of the connection establishment. The FIGS. 2a and 2b illustrate two authorization keys 50-1 and 50-2 which are different with regard to a degree of access authorization which is represented, for example, by an access level. Both of the authorization keys 50-1 and 50-2 are valid for the identical device, which is expressed by an identical identifier used. The identifier is unalterable and thus represents a coordinate-measuring device specific static key 54. In FIGS. 2a and 2b the identical static key 54-1 is used for the same coordinate-measuring device 12-1. This static key 54-1 is used in combination with a dynamic key 52 for generating the respective authorization key 50-1 or 50-2. The generation of the authorization key 50 is performed by utilizing an algorithm, or generation rule 56, being integrated into the above-mentioned software, or app, and being stored in both the memory unit 26 of the coordinate-measuring device 12 and the memory unit 32 of the mobile terminal device 14 (cf. FIG. 1).

The dynamic key 52-1 of FIG. 2a distinguishes from the dynamic key 52-2 of FIG. 2b in an access level, or in the degree of access authorization. The end user (e.g., an operator of the device 12) will typically be allowed to access to areas and functionalities of the selected coordinate-measuring devices 12 being different to the ones of, for example, a service technician of the manufacturer of the device 12. Therefore, the end user can get assigned, for example, the dynamic key 52-1 of FIG. 2a, whereas the service technician gets assigned the dynamic key 52-2 of FIG. 2b. Based on both the static key 54 and the dynamic key 52 the generation rule 56 generates the authorization key 50.

The authorization key 50' of FIG. 2c in turn is intended for a different coordinate-measuring device 12 (here the coordinate-measuring device 12-2) which is expressed in that a static key 54-2 is used, which distinguishes from the static key 54-1 of FIGS. 2a and 2b. The authorization key 50' of FIG. 2c is further based on a generic dynamic key 52 which is not distinguishing with regard to a degree of access authorization. This means that the authorization key 50 can be generated also without consideration of a degree of access authorization. The authorization keys 50, however, are generated separately both at the end of the selected coordinate-measuring device 12 and at the end of the mobile terminal device 14 in a separate manner, and nevertheless are identical because they are based on the same output data (key 52 and key 54) and the same generation rule 56.

It is clear that the wireless connection 16 itself can be encrypted, for example, by means of WPA2.

The data, or the code, being represented by the identifier or the static key 54 can also be a partial key for the authorization key 50. The static key 54 can be used further for identifying the wireless connection (e.g., a radio path) 16 between the mobile terminal device 14 and the selected coordinate-measuring device 12. The name of this radio path can be, for example, "name of coordinate-measuring device+serial number" (e.g., Contura 502925).

The dynamic key 54 is defined by the evaluating and control unit 22 of the selected coordinate-measuring device 12, and subsequently is transferred, preferably physically, to the mobile terminal devices 14 by the user in order to be used there again for the (repeated) generation of the authorization key 50. The dynamic key 52 can be, for example, an alphanumeric password or a signature file.

Figure 3:
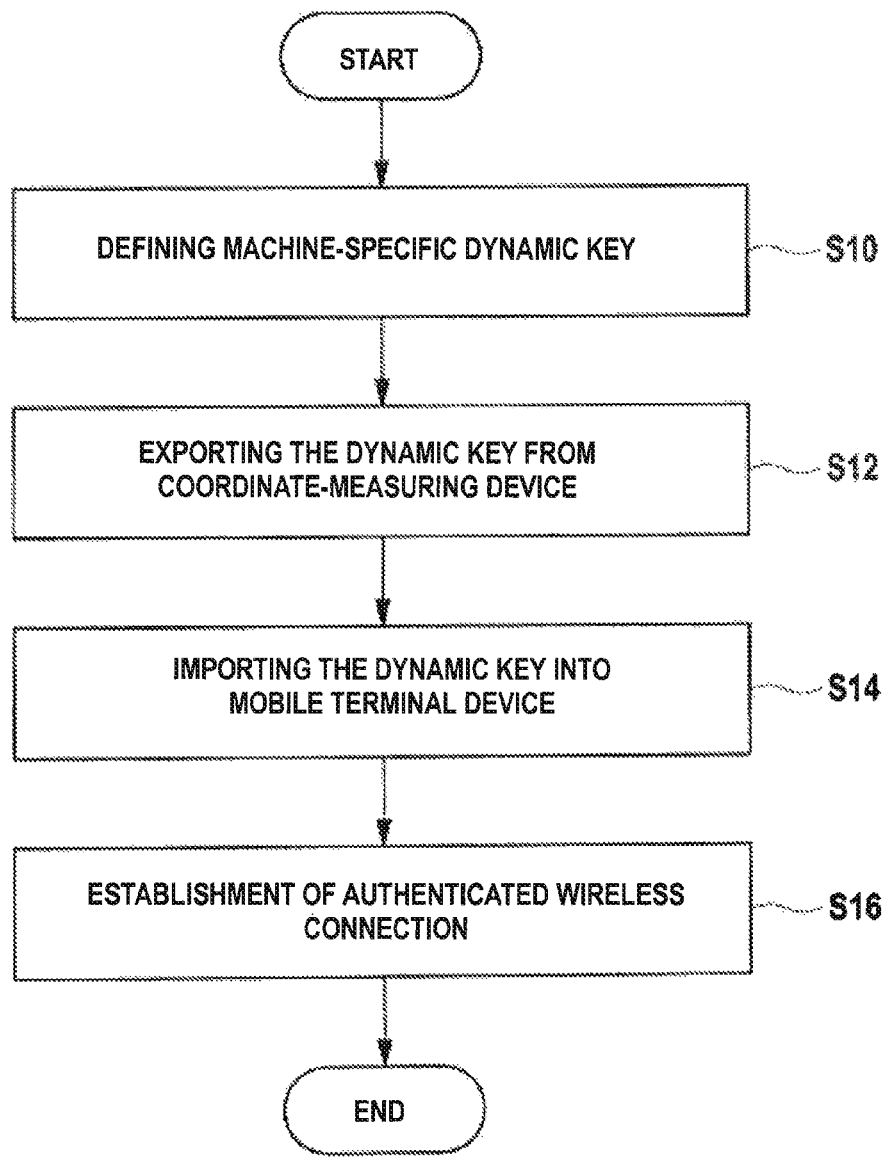
FIG. 3 shows a flow chart of a method in accordance with the invention.

With reference to FIG. 3 a method for generating the authorization key 50 will be described in the following.

In a first step S10 the dynamic key 52 (e.g., alphanumeric password or signature file) is defined at the end of the selected coordinate-measuring device 12. The user who wants to access the selected coordinate-measuring device 12 (wirelessly) by means of his/her mobile terminal device 14 also has access to the evaluating and control unit 22 of the selected coordinate-measuring device 12. The coordinate measuring device specific dynamic key 52 is either determined by the evaluating and control unit 22 of the selected coordinate-measuring device 12 or can be defined, if degree of authorization is irrelevant, by the user himself/herself by means of a corresponding data input into the evaluating and control unit 22. If the dynamic code 54 is determined by the evaluating and control unit 22, this can be done by a simple selection of a key (e.g., PIN or alphanumeric password) or by calculation (e.g., signature file). The calculation in turn can be conducted on the basis of a PIN or an alphanumeric password by utilizing the generation rule 56. As soon as the dynamic key 52 exists it is stored in the memory unit 26 of the selected coordinate-measuring device 12. The user can export this dynamic key 52, for example, via the interface 38. The interface 38 of the coordinate-measuring device 12 can be implemented, for example, as a USB port. If the dynamic key 52 is present in terms of a simple PIN or an alphanumeric passwords this dynamic key 52 can be displayed on a display device, which is not shown designated here in more detail, of the evaluating and control unit 22 so that the user can notate this dynamic key 52.

The exporting of the dynamic key 52 is performed in step S12. In this context, the user moves the dynamic key 52 from the device 12 to the mobile terminal device 14.

Subsequently, this dynamic key 52 is imported by the user into the mobile terminal device 14 in that the user, for example, inserts the USB stick into the interface 38 of the mobile terminal device 14 and then transfers the dynamic key 52 into the memory unit 32 of the mobile terminal device 14.

As soon as the dynamic key 52 is present in the mobile terminal device 14, the wireless connection 16 can be established in an authenticated manner in step S16, wherein preferably both the identifier, or the static key 54 of the selected coordinate-measuring device 12, and the dynamic key 54 can be used for authentication. The mobile terminal device 14 calculates the coordinate measuring device specific authorization key 15 in accordance with the generation rule on the basis of the dynamic key 52, and if desired by utilization of the static key 54 which has been scanned, for example, in advance. The same happens at the end of the selected coordinate-measuring device 12.

It is clear that the authorization key 50 can correspond to the dynamic key 52 if, for example, it is not distinguished between different degrees of access authorization and if the authorization key 50 is not calculated but determined only, such as by a PIN. Then this connection key 50 does not need to contain the identifier or the static key 54 since the static key 54 can serve alone for the identification of the wireless connection 16 between the mobile terminal device 14 and the selected coordinate-measuring device 12. In this case the authorization key 50 is thus determined by the dynamic key 52 only.

It is generally true that the dynamic key 52 can only be changed at the end of the coordinate-measuring device 12. If the dynamic key 52 is changed, then also the authorization key 50 of the respective coordinate-measuring device 12 is changed for the respective access level, as far as access levels are considered.

Figure 4:
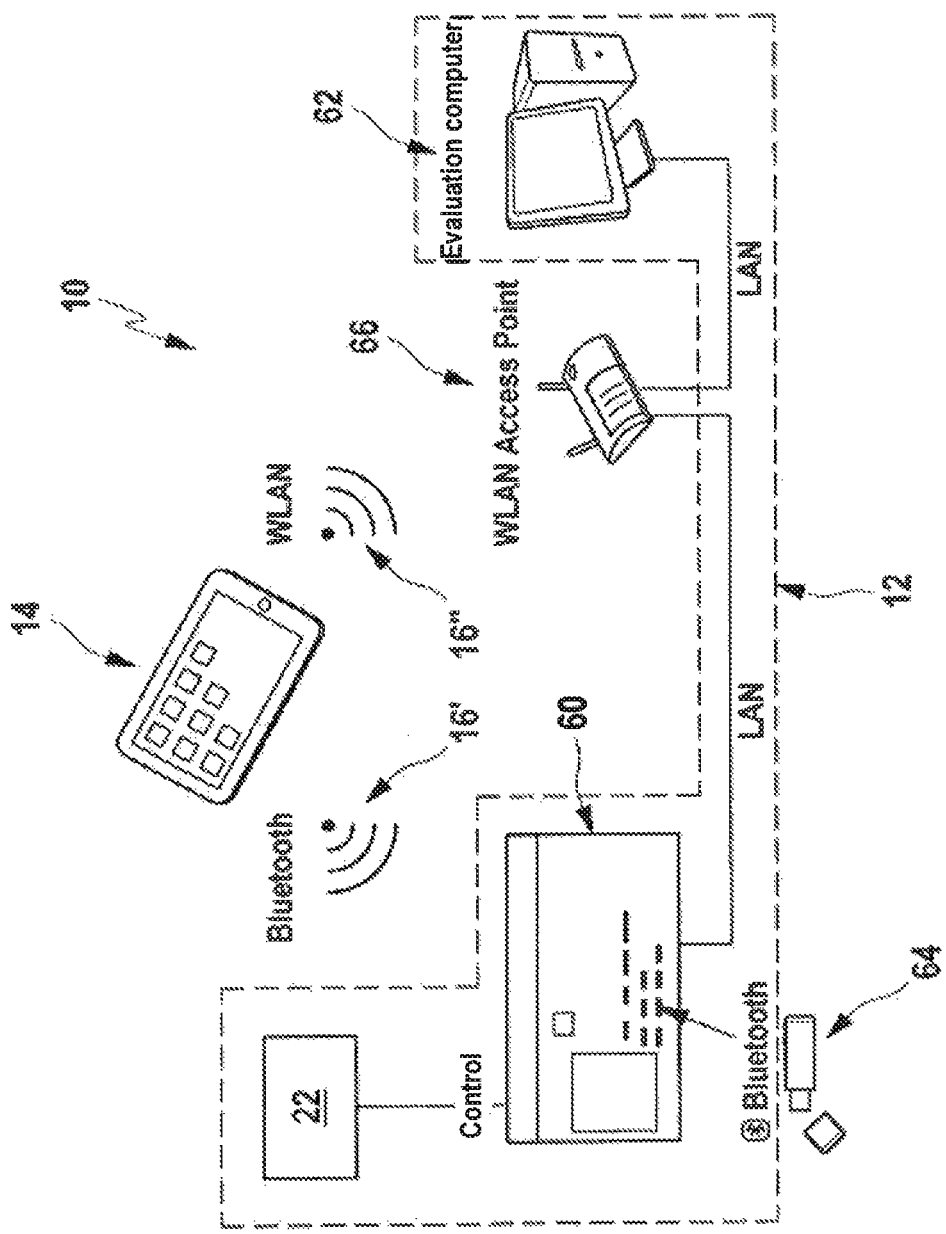
FIG. 4 shows a further embodiment of a retrofitted coordinate-measuring system having two different wireless connections.

FIG. 4 shows a block diagram of a specific embodiment of the system 10, wherein in this case, for example, only one single coordinate-measuring device 12 is used. Components belonging to this coordinate-measuring device 12 are surrounded by auxiliary lines, wherein it is not shown each of the components of the coordinate-measuring device 12 which are shown in FIG. 1. The evaluating and control unit 22 of FIG. 1 is divided into two parts in FIG. 4. In FIG. 4 the evaluating and control unit 22 includes a control device 60 (e.g., an SPS) and an evaluation device 62 (e.g., evaluation computer or evaluation PC). The control device 60 is connected to the measuring system 22, and typically is arranged remotely to the evaluation device 62 which is provided physically separate. The control device 60 is connected via a line (e.g., via a local network, LAN) for the purpose of exchanging data with the evaluation device 62. The coordinate-measuring device 12 of FIG. 4 can be implemented by a conventional coordinate-measuring device 12 which has been retrofitted for implementing the present invention. For this purpose, for example, a Bluetooth adapter 64 can be coupled to the control device 60. It is clear that other transmitter/receiver units 28 can be coupled to the control device 60. This depends on the technical equipment of the control device 60 only. The mobile terminal device 14 is Bluetooth-enabled for establishing a wireless connection 16' (Bluetooth connection) between the control device 60 and the mobile terminal device 14.

A router 66, which serves as a WLAN access point, is coupled to the evaluation device 62. The mobile terminal device 14 also is WLAN-enabled for establishing a wireless connection 16" (WLAN connection) between the mobile terminal device 14 and the evaluation device 62.

It is clear that, dependent on the desired or selected type of the wireless connection 16, compatible transmitter/receiver units 28 and 34 (cf. FIG. 1) are used. In the example of FIG. 4 two transmitter/receiver units 28 are provided for the coordinate-measuring device 12 in terms of the Bluetooth adapter 64 and the (WLAN) router 66. The transmitter/receiver unit 34 of the mobile terminal device 14 is correspondingly formed by two parts.

For implementing the invention the (conventional) coordinate-measuring device 12 is extended with such modules in terms of software by upgrades, which modules are required for the establishment of the authenticated wireless connection 16 as well as for the definition and/or generation of the keys 50, 52, and/or 54. The mobile terminal device 14 is operated by a proprietary software of the manufacturer of the (conventional) coordinate-measuring device 12 including corresponding modules. Thus it is possible to operate even elder coordinate-measuring devices with a modern mobile terminal device 14. If the operation is performed by the end user (customer of the coordinate-measuring device 12) it can be prevented, by controlling the degree of access authorization, that the coordinate-measuring device 12 is damaged due to misoperation. At the same time, however, a service technician can have the opportunity to access basic process parameters of the coordinate-measuring device 12.

The above-described app for the mobile terminal device 14 can be used for information and status display of the coordinate-measuring device 12. The app is available in a free app store (e.g., for Android, Apple, or Microsoft) and can be installed on any arbitrary mobile terminal device 14 having the functionality of WLAN, Bluetooth, camera, and/or NFC. For certain functionalities an Internet connection of the mobile terminal device 14 might be required for conducting, for example, data synchronization with a database of the manufacturer of the coordinate-measuring device 12.

Even if the coordinate-measuring device 12 is not yet configured for implementing the invention, the user can cause an online check of the upgrade capability of the corresponding coordinate-measuring device, for example, by reading the QR code 40 (cf. FIG. 1) on the machine label of the coordinate-measuring device, for initializing, if desired, a direct, preferably fee based, service upgrade order. Alternatively, the upgrade capability of the device 12 can be determined by means of a menu selection on the mobile terminal device 14 or can be requested.

The app on the mobile terminal device 14 shows, preferably meaningful, auxiliary information to the user which is not, or cannot be, shown by the evaluation device 62. For example, it can be displayed: a status display of the device 12 (reference point touched, collision, etc.); a current position of a measuring head as well as latest measuring-value points; remaining time of a current measuring run; alarm notification in case of a measuring-run end or termination; pressing forces of measuring sensors, measuring duration, heating time, date, reason for previous service operations; display of the presumable next service operations; and the like.

Also the display of the following auxiliary functions is possible: recording travel and measuring macros as well as start thereof; generation of diagnose overview including online transmission; initiation of a service order including transmission of operating parameters and equipment features; operating videos; application forms for operating trainings; statistic and error-log notifications; information on possible equipment such as sensors, measuring heads, round tables, additional software packages, probe magazines and the like; activation of test versions of additional software packages; provision of auxiliary hardware; feedback forms; and the like.

The user also receives reasonable auxiliary information for his/her coordinate-measuring device 12 facilitating the operation significantly. The user assists indirectly by sending statistic and error data or by sending improvement suggestions a (continuous) improvement of the coordinate-measuring device 12. New sale paths can be exploited since the contact between the customer of the coordinate-measuring device and the manufacturer thereof is not terminated. Advertising information related to auxiliary components can be transmitted.

It is clear that the systems 10 shown in FIGS. 1 and 4 are of exemplary nature only. The components of the devices 12 shown in FIGS. 1 and 4 can be exchanged and/or extended arbitrarily. The use of Bluetooth and WLAN (IP-address based communication) is of exemplary nature only. It is also clear that the same can be exchanged against different wireless communication protocols. The connection 16 between the coordinate-measuring device 12 and the mobile terminal device 14 can also be conducted via a mobile data connection (GSM, EDGE, UMTS, HSPA, LTE, etc.). In this case the devices 12 and 14 are provided with corresponding transmitter/receiver units, protocols, SIM cards, and the like. In this case the mobile device 14 can also be implemented, for example, by a 3G-enabled tablet including a SIM card. The device 12 can be equipped with a "SurfStick" or a router including a SIM card, which router is connected via WLAN.

The invention claimed is:

1. A coordinate-measuring system for securely and intelligently coupling and connecting a mobile terminal device to a stationary arranged coordinate-measuring device comprising:

a stationary arranged coordinate-measuring device which comprises: a measuring system; an evaluating and control unit having a first data-processing unit; a first memory unit for storing data, parameters, and programs; and a first transmitter/receiver unit for wireless communication; and a mobile terminal device arranged physically separate and being movable to the coordinate-measuring device, and configured to at least one of operate the coordinate-measuring device by a user and display data of the coordinate-measuring device, wherein the mobile terminal device comprises: a second data-processing unit; a second memory unit for storing data and programs; and a second transmitter/receiver unit for the wireless communication;

wherein the coordinate-measuring device and the mobile terminal device are configured to establish an authenticated wireless connection for exchanging data between the coordinate-measuring device and the mobile terminal device;

wherein the coordinate-measuring device has assigned an identifier, which uniquely identifies the coordinate-measuring device, and a dynamic first key, wherein the dynamic first key represents an access authorization, wherein different degrees of access authorization result in different first keys, wherein the dynamic first key is coordinate-measuring device specific, and wherein the identifier is a coordinate-measuring device specific static second key;

wherein the mobile terminal device is further configured to request the first key from the user, wherein the first key is used for authentication in the establishment of the wireless connection;

wherein the evaluating and control unit is configured to generate, in accordance with a generation rule which is stored in the first memory unit, based on the dynamic first key and the static second key a coordinate-measuring device specific authorization key, and to store the generated authorization key in the first memory unit, wherein the wireless connection is authenticated by means of the correspondingly generated authorization key; and wherein the mobile terminal device is configured to request the static second key, and then, by knowledge of the dynamic first key and the static second key, to generate in accordance with the generation rule, which is also stored in the second memory unit, and to store in the second memory unit the identical authorization key for the authenticated establishment of the wireless connection.

2. The system of claim 1, wherein the static second key represents at least one of: a device type of the coordinate-measuring device; a serial number of the coordinate-measuring device; a manufacturing date of the coordinate-measuring device; a manufacturing location of the coordinate-measuring device; and an SAP number of the coordinate-measuring device.

3. The system of claim 1, wherein the static second key uniquely identifies the wireless connection.

4. The system of claim 1, wherein the dynamic first key is at least one of an alphanumeric password and a signature file.

5. The system of claim 1, wherein the static second key is embedded in at least one of an optically readable QR code, and in an electronically readable manner in one of an NFC chip and an RFID chip, wherein the at least one of the QR code and the one of the NFC chip and the RFID chip is attached to the coordinate-measuring device, and wherein the mobile terminal device comprises a reading unit being configured to read the at least one of the QR code and the one of the NFC chip and the RFID chip.

6. The system of claim 1, wherein the mobile terminal device comprises a key port via which the dynamic first key output by the coordinate-measuring device is importable by the user, and wherein the coordinate-measuring device comprises a further key port via which the dynamic first key is exportable.

7. The system of claim 1, wherein the evaluating and control unit comprises an evaluation device and a control device.

8. The system of claim 7, wherein the evaluation device is arranged remotely to the measuring system and the control device.

9. A coordinate-measuring device being configured to be used in a coordinate-measuring system for securely and intelligently coupling and connecting a mobile terminal device to a stationary arranged coordinate-measuring device, the system comprising:

the coordinate-measuring device which is arranged stationary and comprises: a measuring system; an evaluating and control unit having a first data-processing unit; a first memory unit for storing data, parameters, and programs; and a first transmitter/receiver unit for wireless communication; and a mobile terminal device arranged physically separate and being movable to the coordinate-measuring device, and configured to at least one of operate the coordinate-measuring device by a user and display data of the coordinate-measuring device, wherein the mobile terminal device comprises: a second data-processing unit; a second memory unit for storing data and programs; and a second transmitter/receiver unit for the wireless communication;

wherein the coordinate-measuring device and the mobile terminal device are configured to establish an authenticated wireless connection for exchanging data between the coordinate-measuring device and the mobile terminal device;

wherein the coordinate-measuring device has assigned an identifier, which uniquely identifies the coordinate-measuring device, and a dynamic first key, wherein the dynamic first key represents an access authorization, wherein different degrees of access authorization result in different first keys, wherein the dynamic first key is coordinate-measuring device specific, and wherein the identifier is a coordinate-measuring device specific static second key;

wherein the mobile terminal device is further configured to request the first key from the user, wherein the first key is used for authentication in the establishment of the wireless connection;

wherein the evaluating and control unit is configured to generate, in accordance with a generation rule which is stored in the first memory unit, based on the dynamic first key and the static second key a coordinate-measuring device specific authorization key, and to store the generated authorization key in the first memory unit, wherein the wireless connection is authenticated by means of the correspondingly generated authorization key; and wherein the mobile terminal device is configured to request the static second key, and then, by knowledge of the dynamic first key and the static second key, to generate in accordance with the generation rule, which is also stored in the second memory unit, and to store in the second memory unit the identical authorization key for the authenticated establishment of the wireless connection.

10. A mobile terminal device being configured to be used in a coordinate-measuring system for securely and intelligently coupling and connecting a mobile terminal device to a stationary arranged coordinate-measuring device, the system comprising:

a stationary arranged coordinate-measuring device which comprises: a measuring system; an evaluating and control unit having a first data-processing unit; a first memory unit for storing data, parameters, and programs; and a first transmitter/receiver unit for wireless communication; and the mobile terminal device arranged physically separate and being movable to the coordinate-measuring device, and configured to at least one of operate the coordinate-measuring device by a user and display data of the coordinate-measuring device, wherein the mobile terminal device comprises: a second data-processing unit; a second memory unit for storing data and programs; and a second transmitter/receiver unit for the wireless communication;

wherein the coordinate-measuring device and the mobile terminal device are configured to establish an authenticated wireless connection for exchanging data between the coordinate-measuring device and the mobile terminal device;

wherein the coordinate-measuring device has assigned an identifier, which uniquely identifies the coordinate-measuring device, and a dynamic first key, wherein the dynamic first key represents an access authorization, wherein different degrees of access authorization result in different first keys, wherein the dynamic first key is coordinate-measuring device specific, and wherein the identifier is a coordinate-measuring device specific static second key;

wherein the mobile terminal device is further configured to request the first key from the user, wherein the first key is used for authentication in the establishment of the wireless connection;

wherein the evaluating and control unit is configured to generate, in accordance with a generation rule which is stored in the first memory unit, based on the dynamic first key and the static second key a coordinate-measuring device specific authorization key, and to store the generated authorization key in the first memory unit, wherein the wireless connection is authenticated by means of the correspondingly generated authorization key; and wherein the mobile terminal device is configured to request the static second key, and then, by knowledge of the dynamic first key and the static second key, to generate in accordance with the generation rule, which is also stored in the second memory unit, and to store in the second memory unit the identical authorization key for the authenticated establishment of the wireless connection.

11. A method for securely and intelligently coupling as well as connecting a mobile terminal device to a stationary arranged coordinate-measuring device comprising the steps of:

defining a dynamic first key, wherein the dynamic first key represents an access authorization, wherein different degrees of access authorization result in different first keys, and storing the dynamic first key in a first memory unit of the coordinate-measuring device;

exporting the dynamic first key from the coordinate-measuring device to the user;

importing the dynamic first key into the mobile terminal device by the user;

establishing a wireless connection between the coordinate-measuring device and the mobile terminal device, wherein the establishment of the wireless connection is conducted in an authenticated manner by utilization of an identifier, which uniquely identifies the coordinate-measuring device, and the dynamic first key for generation of a coordinate-measuring device specific authorization key in accordance with a generation rule, which is stored in the coordinate-measuring device and in the mobile terminal device, by the coordinate-measuring devices and by the mobile terminal device, wherein the dynamic first key is coordinate-measuring device specific, and wherein the identifier is a coordinate-measuring device specific static second key.

12. The method of claim 11, wherein the identifier is a static second key, wherein the dynamic first key is coordinate-measuring device specific, wherein the method further comprises:

importing the static second key into the mobile terminal device by the user;

generating the coordinate-measuring device specific authorization key based on the dynamic first key and the static second key in accordance with the generation rule by the coordinate-measuring device and the mobile terminal device; and storing the authorization key in the coordinate-measuring device and in the mobile terminal device;

authenticating the establishment of the wireless connection by utilizing the authorization key.

13. The method of claim 11, wherein the steps of importing the keys comprises:

reading the dynamic first key from the coordinate-measuring device onto a data-storage medium by the user;

reading the dynamic first keys from the data-storage medium into the mobile terminal device by the user; and reading the static second key by scanning the second static key, which is attached to the coordinate-measuring device in a freely-accessible manner, by the user by means of the mobile terminal device.

* * * * *